United States Patent
Van Syckel et al.

(10) Patent No.: US 11,113,284 B2
(45) Date of Patent: Sep. 7, 2021

(54) VIRTUAL BACKWARD ASSOCIATIONS FOR GENERIC REQUEST HANDLING BASED ON MODELS

(71) Applicant: SAP SE, Walldorf (DE)

(72) Inventors: Sebastian Van Syckel, Mannheim (DE); Wolfram Kleis, Bad Schönborn (DE); Nico Haller, Heidelberg (DE)

(73) Assignee: SAP SE, Walldorf (DE)

( * ) Notice: Subject to any disclaimer, the term of this patent is extended or adjusted under 35 U.S.C. 154(b) by 118 days.

(21) Appl. No.: 16/537,036

(22) Filed: Aug. 9, 2019

(65) Prior Publication Data

US 2021/0042312 A1    Feb. 11, 2021

(51) Int. Cl.
    *G06F 16/2453*    (2019.01)
    *G06F 16/9532*    (2019.01)
    *G06F 16/242*     (2019.01)
    *G06F 16/25*      (2019.01)

(52) U.S. Cl.
    CPC .... *G06F 16/24547* (2019.01); *G06F 16/2423* (2019.01); *G06F 16/252* (2019.01); *G06F 16/9532* (2019.01)

(58) Field of Classification Search
    CPC .......... G06F 16/24547; G06F 16/9532; G06F 16/2423; G06F 16/252
    USPC ...................................................... 707/706
    See application file for complete search history.

(56) References Cited

U.S. PATENT DOCUMENTS

| | | | |
|---|---|---|---|
| 6,591,272 B1 * | 7/2003 | Williams | G06F 16/289 |
| 7,240,364 B1 * | 7/2007 | Branscomb | H04L 29/12113 |
| | | | 726/5 |
| 7,577,681 B1 * | 8/2009 | Rozenman | G06F 16/284 |
| 7,603,366 B1 * | 10/2009 | Gritsay | G06F 16/284 |
| 7,899,796 B1 * | 3/2011 | Borthwick | G06F 16/24556 |
| | | | 707/692 |
| 8,813,026 B1 * | 8/2014 | Vobugari | G06F 8/35 |
| | | | 717/104 |
| 9,747,363 B1 * | 8/2017 | Smith | G06F 16/2237 |
| 10,776,366 B1 * | 9/2020 | Astretsov | G06F 16/24573 |
| 11,023,430 B2 * | 6/2021 | Giannikis | G06F 16/2343 |
| 2002/0099691 A1 * | 7/2002 | Lore | G06F 16/2237 |
| 2004/0024790 A1 * | 2/2004 | Everett | G06F 16/284 |
| 2012/0331013 A1 * | 12/2012 | Vickers | G06F 16/25 |
| | | | 707/804 |

(Continued)

OTHER PUBLICATIONS

Microsoft, "Entity Data Model: Primitive Data Types" Mar. 29, 2017, [retrieved on Aug. 9, 2019], retrieved from: URL <https://docs.microsoft.com/en-us/dotnet/framework/data/adonet/entity-data-model-primitive-data-types>, 3 pages.

(Continued)

*Primary Examiner* — Mark E Hershley
(74) *Attorney, Agent, or Firm* — Fish & Richardson P.C.

(57) ABSTRACT

Methods, systems, and computer-readable storage media for receiving, in response to instantiation of an application that enables access to data within the database layer through a data model provided as a computer-readable file, the data model defining a set of associations between two or more tables stored in the database layer, processing the data model to provide a set of inverted associations, each inverted association being specific to a respective association in the set of associations, generating an enriched data model including the set of associations of the data model and the set of inverted associations, and hosting a service that uses the enriched data model to enable access to the data within the database layer based on one or more queries submitted from a web client.

20 Claims, 6 Drawing Sheets

(56) References Cited

U.S. PATENT DOCUMENTS

| | | | | |
|---|---|---|---|---|
| 2013/0144878 | A1* | 6/2013 | James | G06F 16/24573 707/736 |
| 2013/0159938 | A1* | 6/2013 | James | G06F 3/038 715/863 |
| 2014/0032588 | A1* | 1/2014 | Getmanets | G06F 16/283 707/760 |
| 2016/0188422 | A1* | 6/2016 | Guntaka | G06F 11/1469 714/4.3 |
| 2017/0180567 | A1* | 6/2017 | Sharma | H04M 3/42153 |
| 2017/0235848 | A1* | 8/2017 | Dusen | G06F 16/904 705/12 |
| 2018/0349456 | A1* | 12/2018 | Pogrebtsov | G06F 16/248 |
| 2018/0357274 | A1* | 12/2018 | Vishal | G06F 16/907 |
| 2019/0212881 | A1* | 7/2019 | Rommel | G06F 9/451 |

OTHER PUBLICATIONS

Oasis, "Odata Version 4.0 Part 3: Common Schema Definition Language (CSDL) Plus Errata 03" Jun. 2, 2016. [retrieved on Aug. 9, 2019], retrieved from: URL <http://docs.oasis-open.org/odata/odata/v4.0/errata03/os/complete/part3-csdl/odata-v4.0-errata03-os-part3-csdl-complete.html#_Toc453752491>, 80 pages.

Oasis, "Odata Version 4.01. Part 1: Protocol" Janaury 30, 2018, [retrieved on Aug. 9, 2019], retrieved from: URL <http://docs.oasis-open.org/odata/odata/v4.01/cs01/part1-protocol/odata-v4.01-cs01-part1-protocol.html#sec_DataModel>, 85 pages.

Wikipedia Contributors, "Object Relational Mapping" Retrieved on or before Apr. 20, 2019, via Internet Archive Nayback Machine URL<http://web.archive.org/web/20190420073841/https://en.wikipedia.org/wiki/Object-relational_mapping>, [retrieved on Jul. 30, 2019], retrieved from: <https://en.wikipedia.org/wiki/Object-relational_mapping>, 4 pages.

Wikipedia Contributors, "Open Data Protocol" retrieved on or before Mar. 21, 2019, via Internet Archive: Wayback Machine URL <http://web.archive.org/web/20190321101904/https://en.wikipedia.org/wiki/Open_Data_Protocol>, [retrieved on Jul. 30, 2019], retrieved from: <https://en.wikipedia.org/wiki/Open_Data_Protocol>, 7 pages.

\* cited by examiner

VIRTUAL BACKWARD ASSOCIATIONS FOR GENERIC REQUEST HANDLING BASED ON MODELS

BACKGROUND

Web clients can be used to publish and/or edit data stored in a database layer. For example, a user can interact with a user interface displayed through a web client to view data and/or edit data provided within a database layer. In some instances, the web client accesses the database layer through one or more services provided as application programming interfaces (APIs). Example services include Open Data Protocol (OData) APIs. In some instances, services are generated one-to-one from a data model. An example data model includes an object-relational mapping (ORM) model. In ORM models, associations between tables, for example, are defined in one direction, whereas in OData services, navigation properties may be followed in both directions. However, bi-direction queries to an underlying database layer are not supported by the uni-directional model.

SUMMARY

Implementations of the present disclosure are directed to adding inverted associations to an in-memory object that represents a respective data model, the inverted associations being used during query processing.

In some implementations, actions include receiving, in response to instantiation of an application that enables access to data within the database layer through a data model provided as a computer-readable file, the data model defining a set of associations between two or more tables stored in the database layer, processing the data model to provide a set of inverted associations, each inverted association being specific to a respective association in the set of associations, generating an enriched data model including the set of associations of the data model and the set of inverted associations, and hosting a service that uses the enriched data model to enable access to the data within the database layer based on one or more queries submitted from a web client. Other implementations of this aspect include corresponding systems, apparatus, and computer programs, configured to perform the actions of the methods, encoded on computer storage devices.

These and other implementations can each optionally include one or more of the following features: the enriched data model is generated at runtime; processing the data model to provide a set of inverted associations includes, for each association in the set of associations, determining a type of the association, and selecting an inverted association based on the type of association, the inverted association is selected from a mapping between associations and inverted associations; the enriched data model is used to transform a query object into a query statement for querying the database layer; the service is an Open Data Protocol (OData) service provided as a representative state transfer (REST) API; and the data model is an object-relational mapping (ORM) model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to adding inverted associations to an in-memory object that represents a respective data model, the inverted associations being used during query processing. Implementations can include actions of receiving, in response to instantiation of an application that enables access to data within the database layer through a data model provided as a computer-readable file, the data model defining a set of associations between two or more tables stored in the database layer, processing the data model to provide a set of inverted associations, each inverted association being specific to a respective association in the set of associations, generating an enriched data model including the set of associations of the data model and the set of inverted associations, and hosting a service that uses the enriched data model to enable access to the data within the database layer based on one or more queries submitted from a web client.

Implementations of the present disclosure are described in further detail herein with reference to services provided based on the Open Data Protocol (OData). OData can be described as an open protocol that enables the generation and consumption of queryable and interoperable representative state transfer (REST)-ful application programming interfaces (APIs) in a standardized manner. More particularly, implementations of the present disclosure are described in further detail herein with reference to OData services, which are OData RESTful APIs. In some examples, and as discussed in further detail herein, web clients can use RESTful APIs to publish and edit resources (e.g., data) stored within a database layer. In some examples, the resources are identified using URLs and are defined in a data model. In some examples, resources are accessed using hypertext transfer protocol (HTTP) messages. OData services can be described in terms of an entity data model (EDM). In particular, a common schema definition language (CSDL) is used to define a representation (e.g., an extensible markup language (XML) representation) of a data model exposed by an OData service.

Implementations of the present disclosure are also described in further detail herein with reference to a data model provided as an object-relational mapping (ORM) model. In general, ORM can be described as a programming technique for converting data between incompatible type systems using object-oriented programming languages, which creates a virtual object database that can be used from within the programming language.

Figure 1:
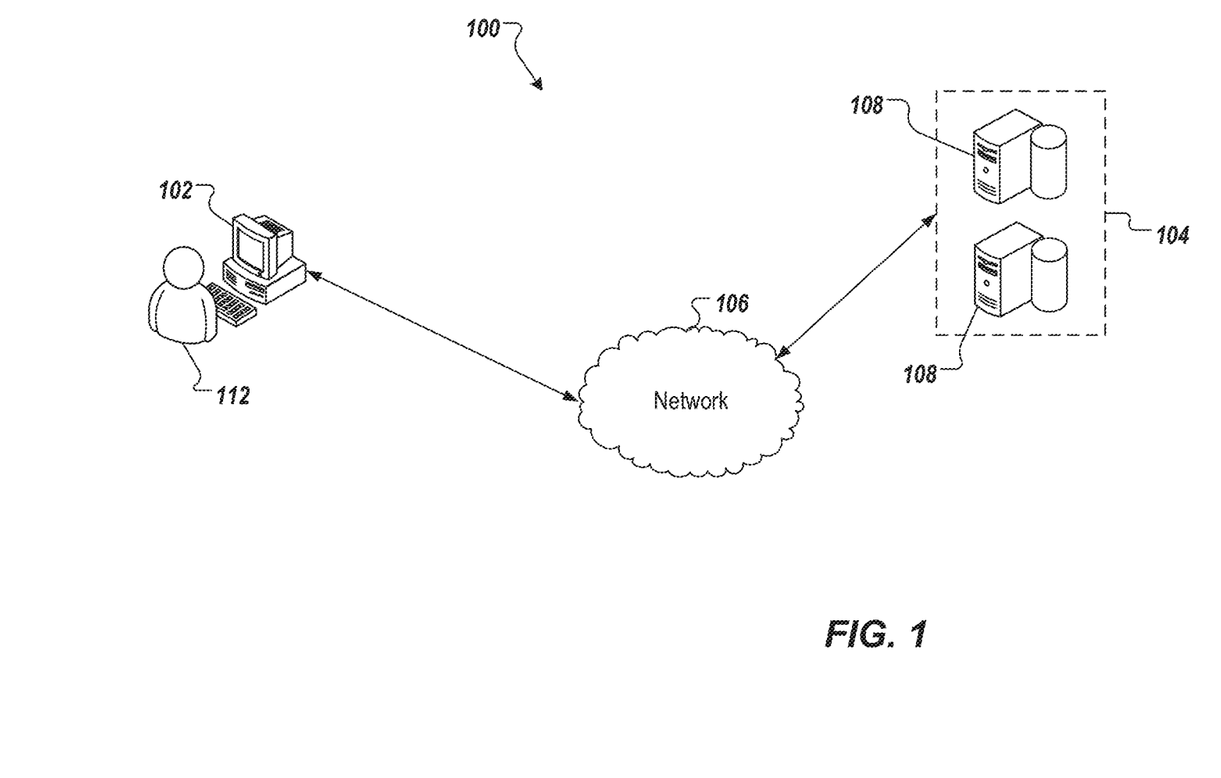
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a database layer that is to be accessed through a web client. For example, the web client can be provided on the client device 112, through which a user 112 can interact with the database layer hosted on the server system 104. In further detail, the web client interacts with the database layer through one or more services, which can be provided as OData services (OData RESTful APIs). For example, one or more queries can be submitted to the database layer through a service.

To provide further context for implementations of the present disclosure, and as introduced above, web clients can be used to publish and/or edit data stored in a database layer. For example, a user can interact with a user interface displayed through a web client to view data and/or edit data provided within a database layer. In some instances, the web client accesses the database layer through one or more services, such as OData services (RESTful APIs), described above. In some instances, services are generated one-to-one from a data model, such as an ORM model. However, in ORM models, associations between tables, for example, are defined in one direction, whereas in OData services, navigation properties may be followed in both directions.

Figure 2:
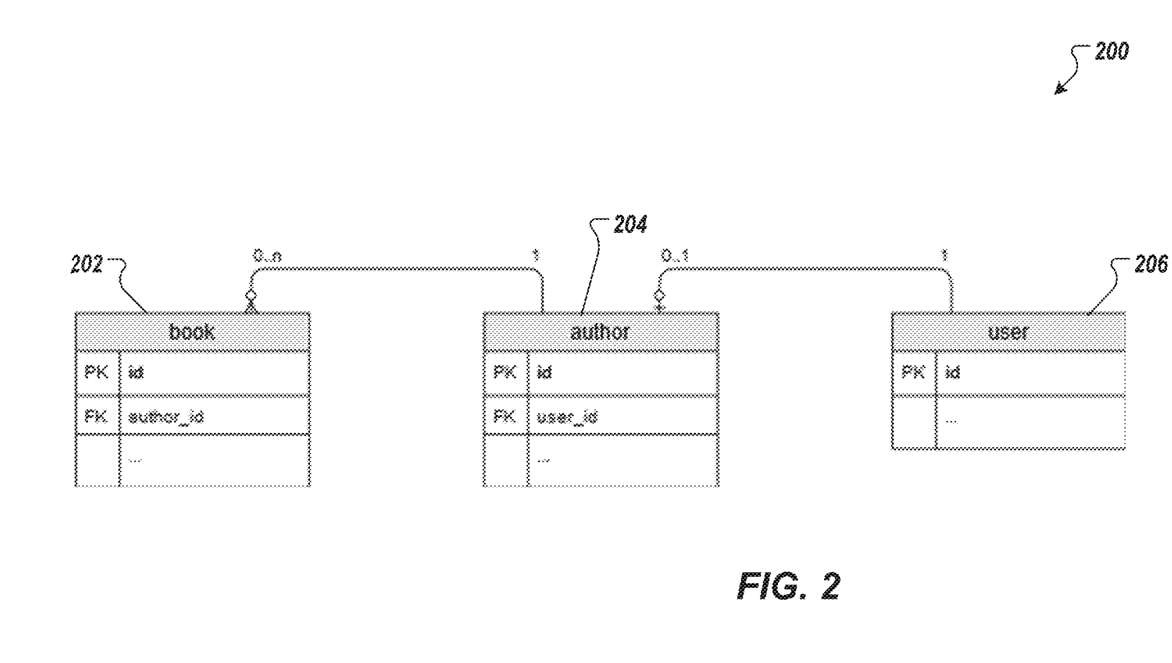
FIG. 2 depicts an example entity relation diagram to illustrate implementations of the present disclosure.

FIG. 2 depicts an example entity relation diagram 200 to illustrate implementations of the present disclosure. In FIG. 2, a first table 202 (book), a second table 204 (author), and a third table 206 (user) are provided (e.g., in a database layer). For example, the first table 202, the second table 204, and the third table 206 can be stored in a database layer that is queried by a user through an OData service (API) and ORM model. In the example scenario, each book belongs to one author, and each author belongs to one user. In the entity relation diagram 200, the first table 202 has a foreign key (FK) author_id, which defines a uni-directional association from the first table 202 to the second table 204, and the second table 204 has a foreign key user_id, which defines a uni-directional association from the second table 204 to the first table 206.

In some examples, a data model (e.g., ORM model), through which the database layer is queried, reflects the data structure of the underlying tables. That is, the data model can include a book model and an author model and would include the uni-directional association therebetween based on the uni-directional association from the first table 202 to the second table 204 depicted in FIG. 2.

In the example of FIG. 2, navigating from a book to its author can be achieved by following an association defined within a book data model (e.g., an ORM model for book). In OData, this would either be done using an additional path segment (e.g., /Book('123')/Author), or using the query option expand (e.g., /Book('123')?$expand=Author). However, the additional path segment only returns the author, and expand returns the book with the author as a nested complex element. This would be the same for the author/user combination as between the second table 204 and the third table 206.

However, the OData protocol enables navigation and/or querying also in the other direction (e.g., /Author('456')/Books or /Author('456')?$expand=Books). That is, instead of starting at the book entity and following the foreign key to get the author, the author model is used as the starting point, and has no association defined to the books table. Further, the logical author to books association has a different cardinality in this direction. That is, every author can have zero to multiple books (e.g., 0 . . . n). Consequently, the result of the queries would be a collection of books or an author entity with an array of books as nested elements, respectively. Accordingly, while a data model, such as an ORM model, provides for uni-directional associations (e.g., association between a book and an author), a service, such as an OData service, supports bi-directional navigation between tables (e.g., from one book, navigate to author, from one author, navigate to 0 . . . n books by that author).

In view of the above context, implementations of the present disclosure address enabling bi-directional queries in a framework that implements uni-directional associations in underlying data models. Implementations of the present disclosure are directed to adding inverted associations to address bi-directionality in services querying data models having uni-directional associations. More particularly, and as describe in further detail herein, implementations of the present disclosure are directed to adding inverted associations to an in-memory model object that represents a respective data model, the inverted associations being used during query processing. In some implementations, and as described in further detail herein, the inverted associations are added at runtime (e.g., at instantiation of an application), but not at design-time or deployment. However, during query processing, the inverted associations function as if statically defined within the data model.

Figure 3:
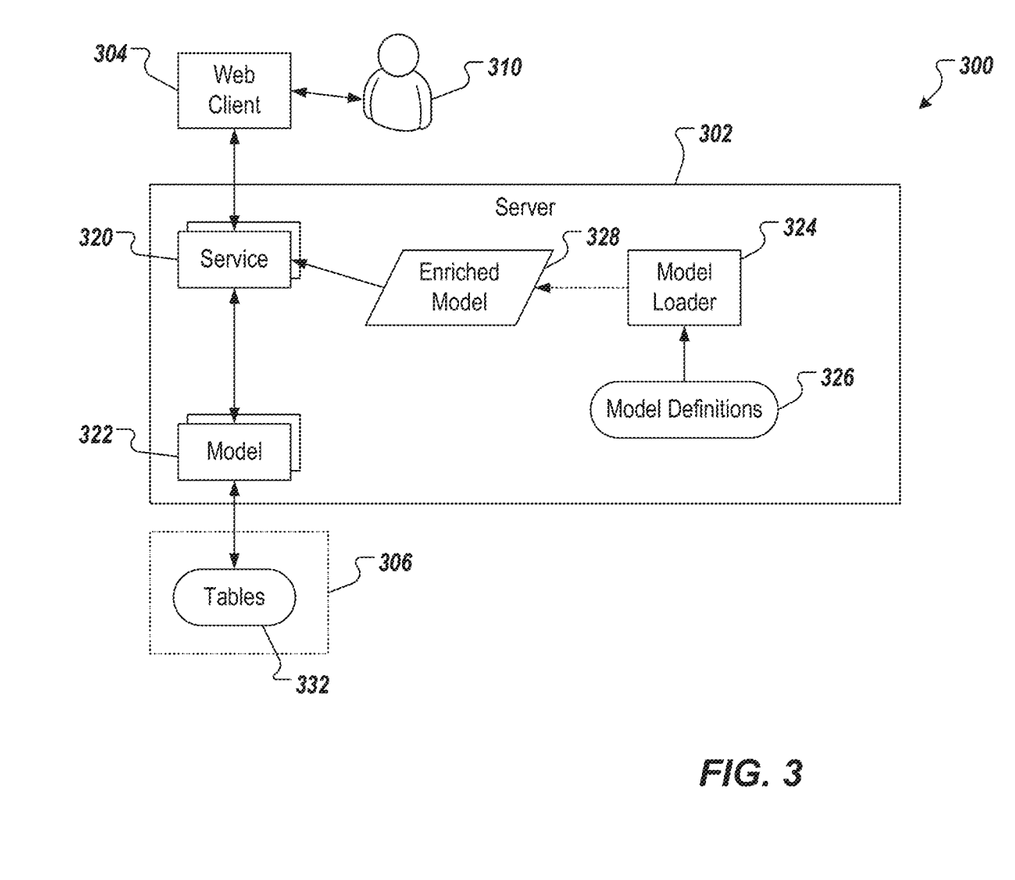
FIG. 3 depicts an example conceptual architecture in accordance with implementations of the present disclosure.

FIG. 3 depicts an example conceptual architecture 300 in accordance with implementations of the present disclosure. In the depicted example, the example conceptual architecture 300 includes a server 302, a web client 304, and a database layer 306. In some examples, the server 302 is provided as a server of a server system (e.g., the server system 104 of FIG. 1). In some examples, the web client 304 is provided by a client device that interacts with the server 302 (e.g., the client device 102 of FIG. 1). In some examples, the database layer 306 is provided separately from the server 302. In some examples, the database layer 306 is provided by the server 302 (e.g., hosted therein).

In the depicted example, the server 302 includes one or more services 320, one or more data models 322, a model loader 324, a model definitions store 326, and an enriched model 328. In some examples, each of the one or more services 320 is provided as an OData service (OData RESTful API). In some examples, each data model 322 is provided as an ORM model. In some implementations, each service 320 corresponds to a respective data model 322. That is, each service 322 is specific to a data model 322.

The database layer 306 includes multiple database tables 332. In some examples, the web client 304 enables a user 310 to interact with the database layer 306 through a service 320 and a corresponding data model 322. That is, the user 310, for example, can create, modify, and/or delete data stored within the tables 332 of the database layer 306 through the web client 304, a service 320, and a data model 322. For example, the user 310 can issue a query to the database layer 306 through the web client 304.

In some implementations, a web client 304, a service 320, a model 322, and one or more of the tables 332 are associated with an application. For example, an application can provide functionality to perform some end goal. An example application can include, without limitation, a data exchange application that enables data from multiple data sources to be communicated between one another. In some examples, the user 310 can interact with the application through the web client 304 to define a data exchange configuration (e.g., data sources, data transfer end-points, permissions). In some examples, the data exchange configuration is represented as data stored in one or more of the tables 332. It is contemplated, however, that implementations of the present disclosure can be realized with any appropriate application.

In accordance with implementations of the present disclosure, and as described in further detail herein, the enriched model 328 is created at start-up of a respective application (e.g., instantiation of the application). In some examples, the enriched model 328 is stored as a data object (e.g., an in-memory data object) during runtime. After runtime, the enriched data model 328 is deleted from memory and is recreated during a subsequent runtime.

In some implementations, the model loader 324 (e.g., provided as one or more computer-executable programs) loads a model from the model store 326. The model loader 324 generates the enriched model 328 based on the underlying data model. The enriched model 328 includes the associations between tables that are defined in the model. The model loader 324 reads the associations defined in the model and, for each association, adds an inverted association in the enriched model 328. Consequently, the enriched model 328 includes both the associations defined in the underlying model and inverted associations added by the model loader 324. The associations and inverted associations are used during query processing to enable interactions with the database layer 306. That is, the service 320 can use the enriched model 328 to transform a query object into a statement (e.g., SQL statement) that is used to query the database layer 306.

In accordance with implementations of the present disclosure, the inverted associations are added at runtime. That is, the inverted associations are added upon instantiation of the application. None of the artifacts (e.g., models 322, models stored in the model store 326) include inverted associations at design-time or deployment. Accordingly, the inverted associations of the present disclosure appear at runtime and, during runtime, are used for query processing as if defined statically in the model. In view of this, the inverted associations can be referred to as virtual associations that are only used in the enriched model at runtime, and are not present in the underlying data structure (e.g., are not present in the database layer). Accordingly, during design-time of the data structure and data model (e.g., data definition), multitudes of potential associations need not be defined in the data structure. For example, a developer that defines the data model need only provide the static associations (e.g., foreign key associations), thereby reducing the complexity of the underlying data model.

In some implementations, the service 320 is hosted on the server 302 during runtime. The service 320 uses the enriched model 328 to provide queries (e.g., data manipulation (DML) statements, such as SELECT or INSERT) that are executed on the database layer 306 to provide a query result. In some examples, the model 322 is used at deploy time for data definition language (DDL) statements (e.g., CREATE TABLE).

Figure 4:
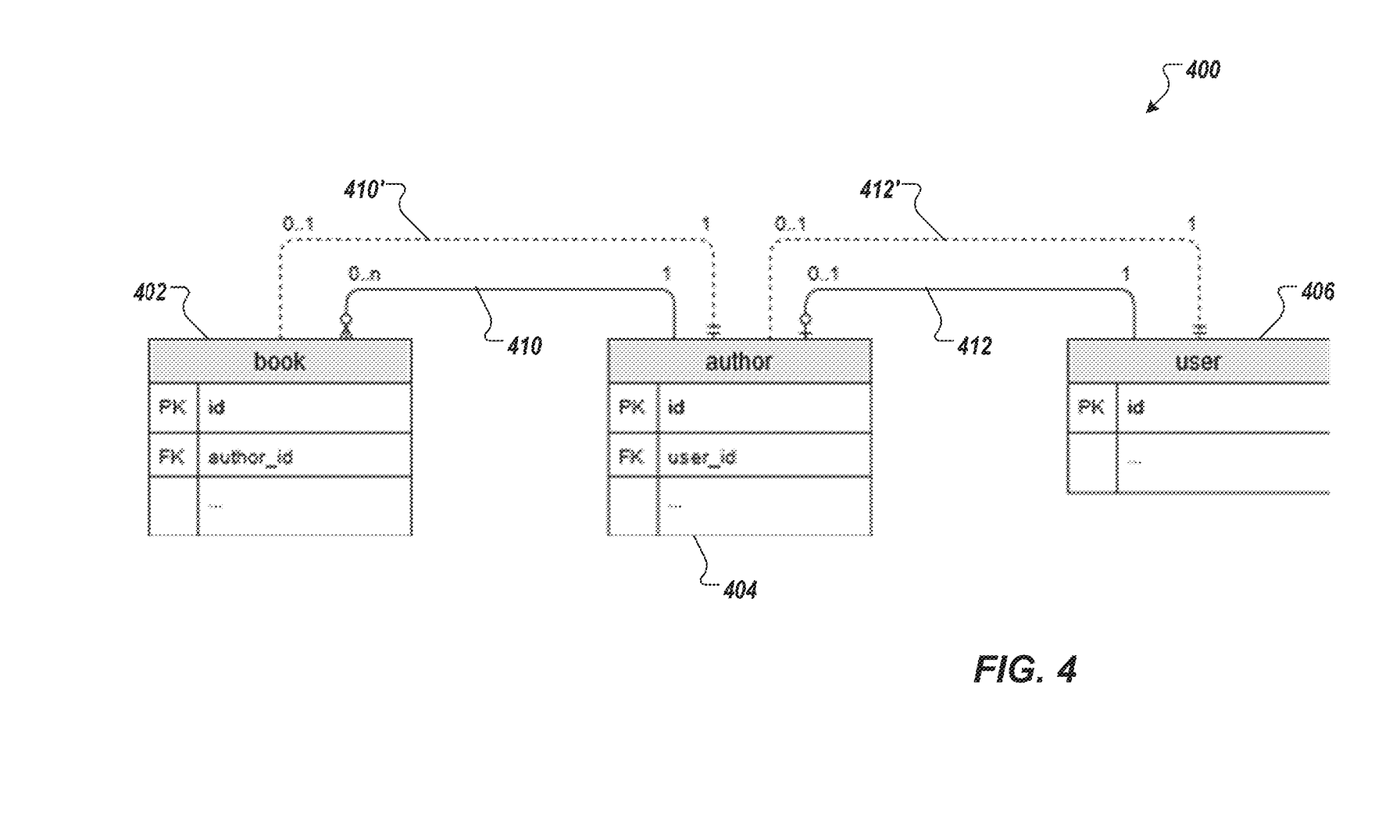
FIG. 4 depicts an example entity relation diagram including added inverted associations in accordance with implementations of the present disclosure.

FIG. 4 depicts an example entity relation diagram 400 including added inverted associations in accordance with implementations of the present disclosure. The example entity diagram 400 corresponds to the example entity diagram 200 of FIG. 2, and includes a first table (books) 402, a second table (author) 404, and a third table (user) 406, each table having a respective primary key (PK). The example entity diagram 400 includes an association 410 between the first table 402 and the second table 404 based on a foreign key (FK) author_id. The example entity diagram 400 includes an association 412 between the second table 404 and the first table 406 based on a foreign key (FK) user_id.

In accordance with implementations of the present disclosure, an inverted association 410' is provided between the first table 402 and the second table 404, and an inverted association 412' is provided between the second table 404 and the third table 406. That is, and as described in further detail herein, the inverted association 410' is added at runtime in response to the association 410 being included in the underlying model, and the inverted association 412' is added at runtime in response to the association 412 being included in the underlying model (e.g., the model from the model store 326 read by the model loader 324 at instantiation of the application). The inverted associations 410', 412' are added to the in-memory model object (e.g., the enriched model 328 of FIG. 3). However, the inverted associations

410', 412' are not added to the underlying model (i.e., the model from the model store 326 that is processed by the model loader 324 of FIG. 3). That is, the underlying model remains unchanged with only the associations 410, 412 being defined therein (e.g., as static associations).

In the example scenario (book/author), the inverted association 410' defines that each author has any number of books (e.g., zero-to-many). Using the inverted association 410', the book table can be joined to the author table with the foreign key defined at the book (e.g., SELECT * FROM author LEFT OUTER JOIN book ON book.author_id= author.id).

Implementations of the present disclosure can be realized using any appropriate ORM. An example ORM includes, without limitation, Sequelize.js (Javascript), which can be described as a promise-based Node.js ORM that includes solid transaction support, relations, eager and lazy loading, and read replication, among other features (e.g., http://docs.sequelizejs.com/). In some examples, the following example association types are provided using Sequelizejs:

- A has one B: HasOne associations are associations where the foreign key for the one-to-one relation exists on the target model.→B has a foreign key that points to A.
- A belongs to B: BelongsTo associations are associations where the foreign key for the one-to-one relation exists on the source model.→A has a foreign key that points to B.
- A has many B: one-To-Many associations are connecting one source with multiple targets. The targets however are again connected to exactly one specific source.→B has a foreign key that points to A.
- A belongs to many B: Belongs-To-Many associations are used to connect sources with multiple targets. Furthermore the targets can also have connections to multiple sources.→B has a foreign key that points to A.

In some implementations, inverted associations are derived from static associations defined within the underlying model. In some examples, the inverted associations are determined based on a map to respective static associations. For example, the static association A has one B is mapped to an inverted association B belongs to A. Consequently, if the underlying model includes the static association A has one B, an inverted association B belongs to A is added in the generated in-memory model object. In some examples, the static association A belongs to B is not mapped to an inverted association, if the association is one-to-one. If, however, the association is one-to-many, the static association A belongs to B is mapped to the inverted association B has many A. Consequently, if the underlying model includes the static association A belongs to B, an inverted association B has many A is added in the generated in-memory model object. In some examples, the static association A has many B is mapped to the inverted association B belongs to A. Consequently, if the underlying model includes the static association A has many B is mapped to an inverted association B belongs to A is added in the generated in-memory model object. In some examples, the static association A belongs to many B is mapped to the inverted association B belongs to many A. Consequently, if the underlying model includes the static association A belongs to many B is mapped to an inverted association B belongs to many A is added in the generated in-memory model object.

In further detail, an enriched data model is generated by a model loader as an in-memory artifact. That is, enriched data models are never persisted and are (re)generated at each server startup for a respective ORM model. In general, an ORM model is loaded by the model loader from a file system (e.g., as .js file) and is transformed to an in-memory data object as the enriched data model, which is used during query building (e.g., to provde DML statements at runtime).

Continuing with the above example, each book has one author and a book model has a "to one" association to author model in its definition. This results in a column authorId in the book table, and to fulfill the OData query GET books?$expand=author out of the box. The author model and the table, however, show no sign of the book model/ table. As is, the OData query GET author?$expand=books cannot be fulfilled with the ORM models. Consequently, and in accordance with implementations of the present disclosure, after loading the ORM models, the author model is enhanced with the inverted association (in this example "to many"). In this manner, the enhanced author model can generate the necessary left outer join to fulfill the OData query GET author?$expand=books.

Figure 5:
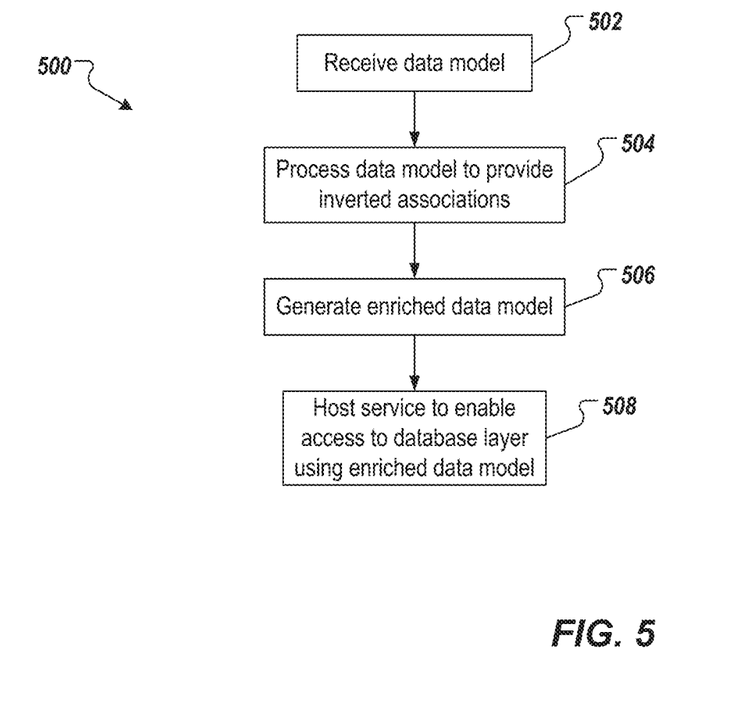
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A data model is received (502). For example, the model loader 324 of FIG. 3 receives a data model (e.g., ORM model) from the data model store 326. In some examples, the data model is received in response to instantiation of an application that enables access to data within a database layer. In some examples, the data model defines a set of associations between two or more tables stored in the database layer. The data model is processed to provide a set of inverted associations (504). For example, the model loader 324 processes the data model to, for each association in the set of associations, determine a type of the association, and select an inverted association based on the type of association. An enriched data model is generated (506). For example, the model loader 324 generates the enriched data model as a data object that is stored in memory. In some examples, the enriched data model includes the set of associations of the data model and the set of inverted associations. A service is hosted to enable access to the database layer using the enriched data model (508). For example, the service 320 is hosted in the server 302 and uses the enriched data model 328 to enable access to the data within the database layer based on one or more queries submitted from a web client. In some examples, the enriched data model is used to transform a query object into a query statement for querying the database layer. In some examples, the service is an OData service provided as a REST API.

Figure 6:
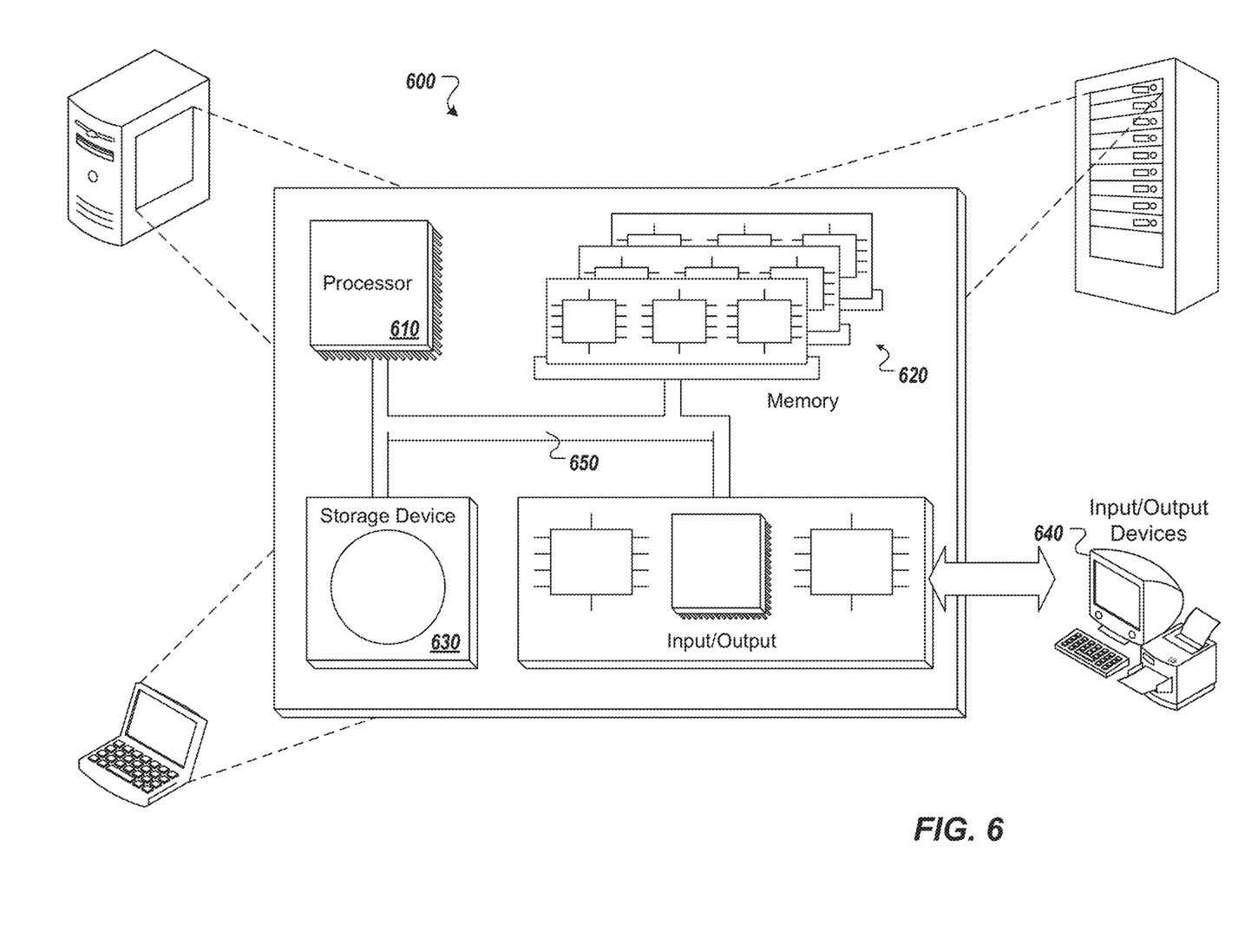
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for accessing a database layer through one or more data models, the method being executed by one or more processors and comprising:
   receiving, in response to instantiation of an application that enables access to data within the database layer, a data model provided as a computer-readable file, the data model defining a set of associations between two or more tables stored in the database layer, each association comprising a foreign key that defines a first uni-directional association between two tables;
   processing the data model to provide a set of inverted associations, each inverted association being specific to a respective association in the set of associations and defining a second uni-directional association between two tables;
   generating an enriched data model comprising the set of associations of the data model and the set of inverted associations; and
   hosting a service that stores the enriched data model as an in-memory data object and uses the enriched data model to enable access to the data within the database layer based on one or more queries submitted from a web client during a runtime and that deletes the enriched data model after the runtime.

2. The method of claim 1, wherein the enriched data model is generated at runtime.

3. The method of claim 1, wherein processing the data model to provide a set of inverted associations comprises, for each association in the set of associations, determining a type of the association, and selecting an inverted association based on the type of association.

4. The method of claim 1, wherein the inverted association is selected from a mapping between associations and inverted associations.

5. The method of claim 1, wherein the enriched data model is used to transform a query object into a query statement for querying the database layer.

6. The method of claim 1, wherein the service comprises an Open Data Protocol (OData) service provided as a representative state transfer (REST) API.

7. The method of claim 1, wherein the data model comprises an object-relational mapping (ORM) model.

8. A non-transitory computer-readable storage medium coupled to one or more processors and having instructions stored thereon which, when executed by the one or more processors, cause the one or more processors to perform operations for accessing a database layer through one or more data models, the operations comprising:

receiving, in response to instantiation of an application that enables access to data within the database layer, a data model provided as a computer-readable file, the data model defining a set of associations between two or more tables stored in the database layer, each association comprising a foreign key that defines a first uni-directional association between two tables;

processing the data model to provide a set of inverted associations, each inverted association being specific to a respective association in the set of associations and defining a second uni-directional association between two tables;

generating an enriched data model comprising the set of associations of the data model and the set of inverted associations; and hosting a service that stores the enriched data model as an in-memory data object and uses the enriched data model to enable access to the data within the database layer based on one or more queries submitted from a web client during a runtime and that deletes the enriched data model after the runtime.

9. The computer-readable storage medium of claim 8, wherein the enriched data model is generated at runtime.

10. The computer-readable storage medium of claim 8, wherein processing the data model to provide a set of inverted associations comprises, for each association in the set of associations, determining a type of the association, and selecting an inverted association based on the type of association.

11. The computer-readable storage medium of claim 8, wherein the inverted association is selected from a mapping between associations and inverted associations.

12. The computer-readable storage medium of claim 8, wherein the enriched data model is used to transform a query object into a query statement for querying the database layer.

13. The computer-readable storage medium of claim 8, wherein the service comprises an Open Data Protocol (OData) service provided as a representative state transfer (REST) API.

14. The computer-readable storage medium of claim 8, wherein the data model comprises an object-relational mapping (ORM) model.

15. A system, comprising:

a computing device; and a computer-readable storage device coupled to the computing device and having instructions stored thereon which, when executed by the computing device, cause the computing device to perform operations for accessing a database layer through one or more data models, the operations comprising:

receiving, in response to instantiation of an application that enables access to data within the database layer, a data model provided as a computer-readable file, the data model defining a set of associations between two or more tables stored in the database layer, each association comprising a foreign key that defines a first uni-directional association between two tables;

processing the data model to provide a set of inverted associations, each inverted association being specific to a respective association in the set of associations and defining a second uni-directional association between two tables;

generating an enriched data model comprising the set of associations of the data model and the set of inverted associations; and hosting a service that stores the enriched data model as an in-memory data object and uses the enriched data model to enable access to the data within the database layer based on one or more queries submitted from a web client during a runtime and that deletes the enriched data model after the runtime.

16. The system of claim 15, wherein the enriched data model is generated at runtime.

17. The system of claim 15, wherein processing the data model to provide a set of inverted associations comprises, for each association in the set of associations, determining a type of the association, and selecting an inverted association based on the type of association.

18. The system of claim 15, wherein the inverted association is selected from a mapping between associations and inverted associations.

19. The system of claim 15, wherein the enriched data model is used to transform a query object into a query statement for querying the database layer.

20. The system of claim 15, wherein the service comprises an Open Data Protocol (OData) service provided as a representative state transfer (REST) API.

* * * * *